(12) United States Patent
Kawa et al.

(10) Patent No.: US 7,630,018 B2
(45) Date of Patent: Dec. 8, 2009

(54) ON-SCREEN DISPLAY APPARATUS AND ON-SCREEN DISPLAY GENERATION METHOD

(75) Inventors: Seiji Kawa, Kanagawa (JP); Takao Inoue, Kanagawa (JP)

(73) Assignee: Sony Corporation, Tokyo (JP)

( * ) Notice: Subject to any disclaimer, the term of this patent is extended or adjusted under 35 U.S.C. 154(b) by 786 days.

(21) Appl. No.: 11/395,198

(22) Filed: Apr. 3, 2006

(65) Prior Publication Data
US 2006/0232708 A1    Oct. 19, 2006

(30) Foreign Application Priority Data
Apr. 15, 2005   (JP)   ............... 2005-118948

(51) Int. Cl.
*H04N 5/50* (2006.01)
*H04N 5/445* (2006.01)
(52) U.S. Cl. ............................ 348/569; 348/563
(58) Field of Classification Search .................. 348/569, 348/563, 564, 586, 588, 589, 598–600; 345/629, 345/634, 638; *H04N 5/445, 5/50, 9/74, 9/76*
See application file for complete search history.

(56) References Cited

U.S. PATENT DOCUMENTS 6,304,245 B1   10/2001   Groenenboom
6,885,408 B2 *  4/2005   Hirano ...................... 348/588
7,542,098 B2 *  6/2009   Mamba et al. .............. 348/569

FOREIGN PATENT DOCUMENTS

| JP | 11-196308   | 7/1999  |
| JP | 2003-259213 | 9/2003  |
| JP | 2003-324652 | 11/2003 |
| JP | 2005-123775 | 5/2005  |

* cited by examiner

*Primary Examiner*—Sherrie Hsia
(74) *Attorney, Agent, or Firm*—Oblon, Spivak, McClelland, Maier & Neustadt, L.L.P.

(57) ABSTRACT

The present invention allows a device to easily convert an on-screen image in HD format or SD format without increasing the processing load. The device according to an embodiment of the present invention uses the on-screen image D3 in which the number of horizontal pixels is set between horizontal pixel counts of HD format and horizontal pixel counts of SD format. Therefore, the device can utilize a relatively simple conversion ratio when converting the image in HD and SD format. This tremendously reduces the computational processing load. In addition, since the device uses the simple conversion ratio, the device can maintain the quality of the on-screen image D3.

10 Claims, 7 Drawing Sheets

ON-SCREEN DISPLAY APPARATUS AND ON-SCREEN DISPLAY GENERATION METHOD

CROSS REFERENCES TO RELATED APPLICATIONS

The present invention contains subject matter related to Japanese Patent Application JP2005-118948 filed in the Japanese Patent Office on Apr. 15, 2005, the entire contents of which being incorporated herein by reference.

BACKGROUND OF THE INVENTION

1. Field of the Invention

The preset invention relates to on-screen display apparatus and on-screen display generation method, and is preferably applied to a video camera for broadcast stations, for example.

2. Description of Related Art

Video cameras used for production of television programs process video signals in many ways. As an example, a video camera device, which is disclosed in Jpn. Pat. Appln. Laid-Open No. H11-196308, displays an on-screen image including a base image on which a menu image and the like are superimposed.

SUMMARY OF THE INVENTION

By the way, the above-noted video camera may generate the base image in which the number of horizontal pixels is not equal to that of the on-screen image. It increases the processing load of the video camera to change the number of horizontal pixels in the on-screen image in accordance with the number of horizontal pixels in the base image.

In addition, in a case where the video camera down-converts or up-converts the number of horizontal pixels in the on-screen image based on a complex conversion ratio, this increases the processing load and also deteriorates the quality of the resulting on-screen image.

The present invention has been made in view of the above points and is intended to provide high-quality on-screen display apparatus and on-screen display generation method which can easily convert on-screen images in accordance with high-definition television signals or standard-definition television signals and output the resulting images without increasing the processing load.

In an embodiment of the present invention, an on-screen display apparatus including: an on-screen image generation section for generating an on-screen image having a predetermined number of horizontal pixels, the predetermined number of horizontal pixels being set between horizontal pixel counts of high definition television signals and horizontal pixel counts of standard definition television signals; a first horizontal pixel conversion section for converting the number of horizontal pixels of the on-screen image by using a certain conversion ratio such that the number of horizontal pixels of the on-screen image corresponds to the horizontal pixel counts of the high definition television signals; and a second horizontal pixel conversion section for converting the number of horizontal pixels of the on-screen image by using a certain conversion ratio such that the number of horizontal pixels of the on-screen image corresponds to the horizontal pixel counts of the standard definition television signals.

In this manner, the on-screen display apparatus uses the on-screen image in which the number of horizontal pixels is set to a certain number which is between the horizontal pixel counts of high definition television signals and the horizontal pixel counts of standard definition television signals. Therefore, the on-screen display apparatus can utilize a relatively simple conversion ratio when converting the image in formats of high definition television signals and standard definition television signals. This tremendously reduces the computational processing load. In addition, since the on-screen display apparatus uses the simple conversion ration, the on-screen display apparatus can maintain the quality of the on-screen image.

Further, in an embodiment of the present invention, an on-screen display generation method including: an on-screen image generation step of generating an on-screen image having a predetermined number of horizontal pixels, the predetermined number of horizontal pixels being set between horizontal pixel counts of high definition television signals and horizontal pixel counts of standard definition television signals; and a horizontal pixel conversion step of converting the number of horizontal pixels of the on-screen image by using a certain conversion ratio such that the number of horizontal pixels of the on-screen image corresponds to the horizontal pixel counts of the high definition television signals, and converting the number of horizontal pixels of the on-screen image by using a certain conversion ratio such that the number of horizontal pixels of the on-screen image corresponds to the horizontal pixel counts of the standard definition television signals.

In this manner, the on-screen display generation method uses the on-screen image in which the number of horizontal pixels is set to a certain number which is between the horizontal pixel counts of high definition television signals and the horizontal pixel counts of standard definition television signals. Therefore, the on-screen display generation method can utilize a relatively simple conversion ratio when converting the image in formats of high definition television signals and standard definition television signals. This tremendously reduces the computational processing load. In addition, since the on-screen display generation method uses the simple conversion ration, the on-screen display generation method can maintain the quality of the on-screen image.

In an embodiment of the present invention, the on-screen display apparatus and the on-screen display generation method use the on-screen image in which the number of horizontal pixels is set to a certain number which is between the horizontal pixel counts of high definition television signals and the horizontal pixel counts of standard definition television signals. Therefore, the on-screen display apparatus and the on-screen display generation method can utilize a relatively simple conversion ratio when converting the image in formats of high definition television signals and standard definition television signals. This tremendously reduces the computational processing load. In addition, since the on-screen display apparatus and the on-screen display generation method use the simple conversion ration, the on-screen display apparatus and the on-screen display generation method can maintain the quality of the on-screen image. Thus, the on-screen display apparatus and the on-screen display generation method can easily convert on-screen images in accordance with high-definition television signals or standard-definition television signals and output the resulting images without increasing the processing load.

The nature, principle and utility of the present invention will become more apparent from the following detailed description when read in conjunction with the accompanying drawings in which like parts are designated by like reference numerals or characters.

DETAILED DESCRIPTION OF THE EMBODIMENTS

An embodiment of the present invention will be described in detail with reference to the accompanying drawings.

(1) Configuration of Video Camera

Figure 1:
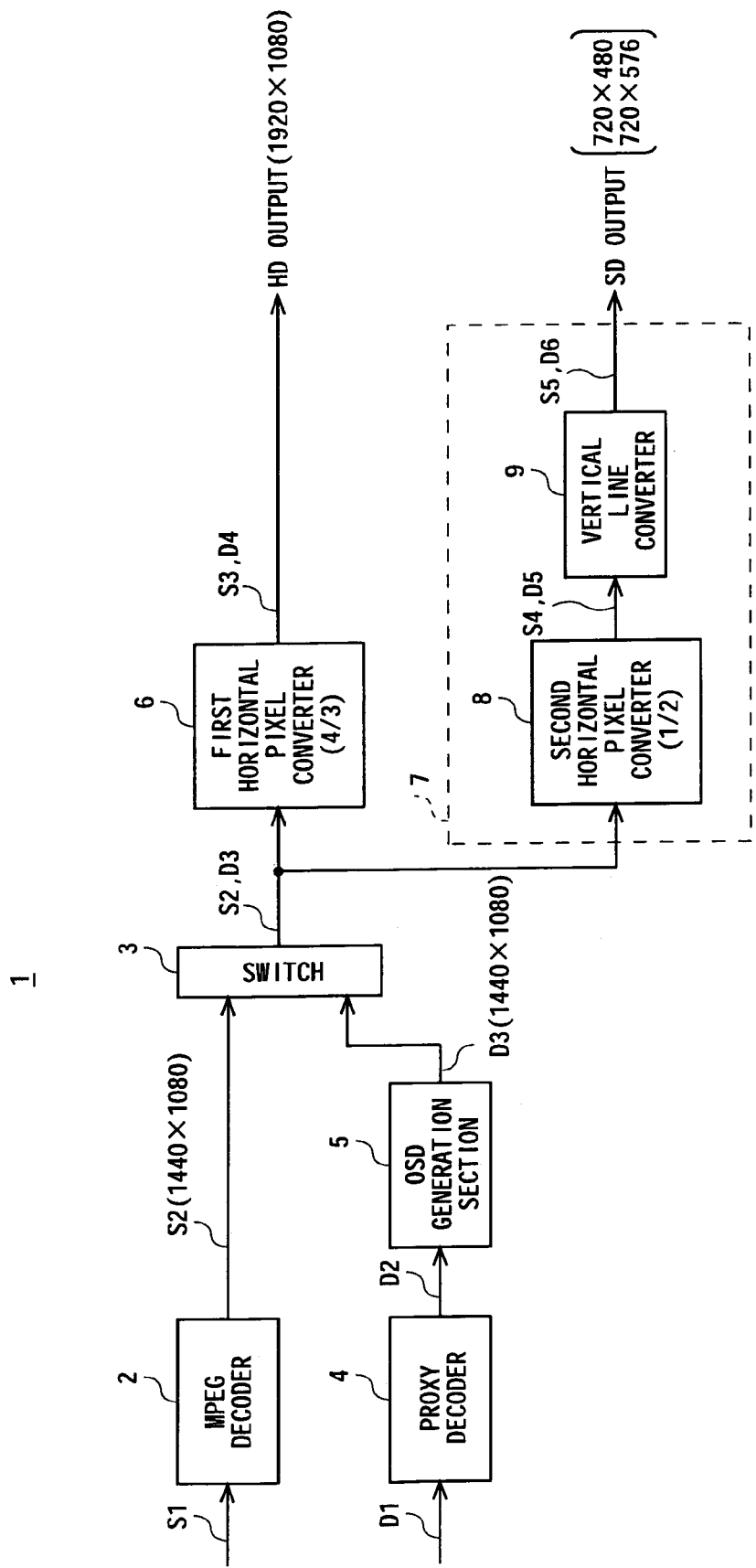
FIG. 1 is a schematic perspective view showing the configuration of a video camera according to an embodiment of the present invention.

In FIG. 1, the reference numeral 1 represents a video camera as a whole. For example, the video camera 1 utilizes a Moving Picture Experts Group (MPEG) decoder 2 to decode video data S1, which was stored in MPEG2 format and which shows main-line pictures. The video camera 1 then supplies to a switch circuit 3 the resulting video signal S2 in which the size of images is 1440×1080 ([the number of horizontal pixels]×[the number of lines]).

In this case, the video signal S2 represents images whose size is based on MPEG2 video standard (Profile and Level: MP@H-14). In addition, in terms of the processing load of the video camera 1, the video signal S2 has the proper number of pixels for a following first horizontal pixel conversion circuit 6 and a second horizontal pixel conversion circuit 8 to perform conversion.

The video camera 1 also has a proxy decoder 4 that decodes proxy-video data D1. The proxy-video data D1 for example represents a reference picture whose size is set to one of the followings: 352×288 on luminance resolution and 180×144 on chrominance resolution (Common Intermediate Format (CIF) in MPEG4); or, 352×240 on luminance resolution and 176×120 on chrominance resolution (Source Input Format (SIF)). The proxy decoder 4 then supplies the resulting proxy video signal D2 to an on-screen display generation section (also referred to as an "OSD generation section") 5.

The OSD generation section 5 puts together a plurality of proxy video signals D2 to generate a thumbnail list screen (also referred to as a "thumbnail video screen") whose size is 1440×1080 ([the number of horizontal pixels]×[the number of lines]) The OSD generation section 5 then generates an on-screen image D3 by superimposing background images and the like on the background side of the thumbnail video screen and superimposing menu images and the like on the foreground side of the thumbnail video screen. In other words, to generate the on-screen image D3, the OSD generation section 5 superimposes background images and the like behind the thumbnail video screen as a background screen, and superimposes menu images and the like in front of the thumbnail video screen as a foreground screen. The OSD generation section 5 subsequently supplies the resulting on-screen image D3 to the switch circuit 3.

In this case, the on-screen image D3 represents images whose size is based on MPEG2 video standard (Profile and Level: MP@H-14). In addition, in terms of the processing load of the video camera 1, the on-screen image D3 has the proper number of pixels for the following first horizontal pixel conversion circuit 6 and second horizontal pixel conversion circuit 8 to perform conversion.

The switch circuit 3 switches in response to user's operation for operation buttons (not shown). The switch circuit 3 outputs either the video signal S2 supplied from the MPEG decoder 2 or the on-screen image D3 supplied from the OSD generation section 5.

If the video signal S2 is selected, the switch circuit 3 supplies this video signal S2 to the first horizontal pixel conversion circuit 6 and the second horizontal pixel conversion circuit 8 in a down-conversion section 7.

The first horizontal pixel conversion circuit 6 performs conversion process. In this conversion process, the first horizontal pixel conversion circuit 6 multiplies the number of horizontal pixels in the video signal S2 by 4/3, so that the horizontal pixel counts increase from 1440 to 1920. In this manner, the first horizontal pixel conversion circuit 6 generates a main-line High Definition (HD) image S3 whose size is 1920×1080 ([the number of horizontal pixels]×[the number of lines]). The first horizontal pixel conversion circuit 6 then performs line-out process to output the main-line HD image S3 as main-line HD output.

The second horizontal pixel conversion circuit 8 also performs conversion process. In this conversion process, the second horizontal pixel conversion circuit 8 multiplies the number of horizontal pixels in the video signal S2 by 1/2, so that the horizontal pixel counts decrease from 1440 to 720. In this manner, the second horizontal pixel conversion circuit 8 generates a video signal S4 whose size is 720×1080 ([the number of horizontal pixels]×[the number of lines]). The second horizontal pixel conversion circuit 8 supplies the video signal S4 to a vertical line conversion circuit 9.

The vertical line conversion circuit 9 converts the number of lines in the video signal S4 (whose size is 720×1080 [the number of horizontal pixels]×[the number of lines]) based on a certain conversion ratio. This produces a main-line Standard Definition (SD) image S5 whose size is suitable for finally outputting images in various formats. In this case, the main-line SD image S5 can be 720×480 ([the number of horizontal pixels]×[the number of lines]) size or 720×576 ([the number of horizontal pixels]×[the number of lines]) size for National Television System Committee (NTSC) format or Phase Alternation by Line (PAL) format, respectively. The vertical line conversion circuit 9 then performs line-out process to output the main-line SD image S5 as main-line SD output.

By the way, to generate the video signal S4 with 480 lines, the vertical line conversion circuit 9 multiplies the number of lines in the video signal S4 by 4/9, so that the line counts decrease from 1080 to 480. To generate the video signal S4 with 576 lines, the vertical line conversion circuit 9 multiplies the number of lines in the video signal S4 by 8/15, so that the line counts decrease from 1080 to 576.

If the on-screen image D3 is selected instead of the video signal S2, the switch circuit 3 supplies this on-screen image D3 to the first horizontal pixel conversion circuit 6 and the second horizontal pixel conversion circuit 8.

The first horizontal pixel conversion circuit 6 performs conversion process in the same way as processing the video signal 2. In this conversion process, the first horizontal pixel conversion circuit 6 multiplies the number of horizontal pixels in the on-screen image D3 by 4/3, so that the horizontal-pixel counts increase from 1440 to 1920. In this manner, the first horizontal pixel conversion circuit 6 generates a proxy HD image D4 whose size is 1920×1080 ([the number of horizontal pixels]×[the number of lines]). The first horizontal pixel conversion circuit 6 then performs line-out process to output the proxy HD image D4 as proxy HD output.

The second horizontal pixel conversion circuit 8 performs conversion process in the same way as processing the video signal 2. In this conversion process, the second horizontal pixel conversion circuit 8 multiplies the number of horizontal pixels in the on-screen image D3 by 1/2, so that the horizontal pixel counts decrease from 1440 to 720. In this manner, the second horizontal pixel conversion circuit 8 generates an on-screen image D5 whose size is 720×1080 ([the number of horizontal pixels]×[the number of lines]). The second horizontal pixel conversion circuit 8 supplies the on-screen image D5 to the vertical line conversion circuit 9.

The vertical line conversion circuit 9 converts the number of lines in the on-screen image D5 (whose size is 720×1080 [the number of horizontal pixels]×[the number of lines]) based on a certain conversion ratio. This produces a proxy-SD on-screen image D6 whose size is suitable for finally outputting images in various formats. In this case, the proxy-SD on-screen image D6 can be 720×480 size or 720×576 size for NTSC format or PAL format, respectively. The vertical line conversion circuit 9 then performs line-out process to output the proxy-SD on-screen image D6 as proxy SD output.

As described above, the video camera 1 has the first horizontal pixel conversion circuit 6 that up-converts the number of horizontal pixels in the video signal S2 which was decoded by the MPEG decoder 2 to generate the main-line HD image S3 whose size is 1920×1080 ([the number of horizontal pixels]×[the number of lines]). The video camera 1 then performs line-out process to output the main-line HD image S3 as main-line HD output. The video camera 1 also has the down-conversion section 7 that down-converts the number of horizontal pixels and lines in the video signal 2 to produce the main-line SD image S5 whose size is suitable for NTSC format or PAL format. The video camera 1 then performs line-out process to output the main-line SD image S5 as main-line SD output.

Similarly, the first horizontal pixel conversion circuit 6 of the video camera 1 up-converts the number of horizontal pixels in the on-screen image D3 which was generated by the OSD generation section 5 to produce the proxy HD image D4 whose size is 1920×1080 ([the number of horizontal pixels]×[the number of lines]). The video camera 1 then performs line-out process to output the proxy HD image D4 as proxy HD output. In addition, the down-conversion section 7 of the video camera 1 down-converts the number of horizontal pixels and lines in the on-screen image D3 to generate the proxy-SD on-screen image D6 whose size is suitable for NTSC or PAL format. The video camera 1 then performs line-out process to output the proxy-SD on-screen image D6 as proxy SD output.

In this video camera 1, the size of the video signal S2 and on-screen image D3 is set to 1440×1080 ([the number of horizontal pixels]×[the number of lines]), which is in accord with the MPEG2 video standard (Profile and Level: MP@H-14). Therefore, in order to increase the number of horizontal pixels from 1440 to 1920, the first horizontal pixel conversion circuit 6 utilizes the simple ratio of 4/3, which is calculated from the ratio of 1440:1920, to multiply. In order to decrease the number of horizontal pixels from 1440 to 720, the second horizontal pixel conversion circuit 8 utilizes the simple ratio of 1/2, which is calculated from the ratio of 1440:720, to multiply. That reduces more processing load of the video camera 1 than the video camera 1 uses a complex conversion ratio.

By the way, in this embodiment, the size of the video signal S2 and on-screen image D3 is set to 1440×1080 ([the number of horizontal pixels]×[the number of lines]) on the video camera 1. However, the size of the video signal S2 and on-screen image D3 also can be 1920×1080 ([the number of horizontal pixels]×[the number of lines]) from the beginning so as to match the HD format output.

In this case, the first horizontal pixel conversion circuit 6 of the video camera 1 can be omitted. And the second horizontal pixel conversion circuit 8 utilizes the ratio of 3/8 (calculated from the ratio of 1920:720) to multiply, so that the number of horizontal pixels in the video signals S2 and on-screen image D3 decreases from 1920 to 720.

By the way, in this embodiment, the size of the video signal S2 and on-screen image D3 is set to 1440×1080 ([the number of horizontal pixels]×[the number of lines]) on the video camera 1. However, the size of the video signal S2 and on-screen image D3 also can be 720×1080 ([the number of horizontal pixels]×[the number of lines]) from the beginning so as to match the SD format output.

In this case, the second horizontal pixel conversion circuit 8 of the video camera 1 can be omitted. And the first horizontal pixel conversion circuit 6 utilizes the ratio of 8/3 (calculated from the ratio of 1920:720) to multiply, so that the number of horizontal pixels in the video signals S2 and on-screen image D3 increases from 720 to 1920.

(2) Circuit Configuration of OSD Generation Section

Figure 2:
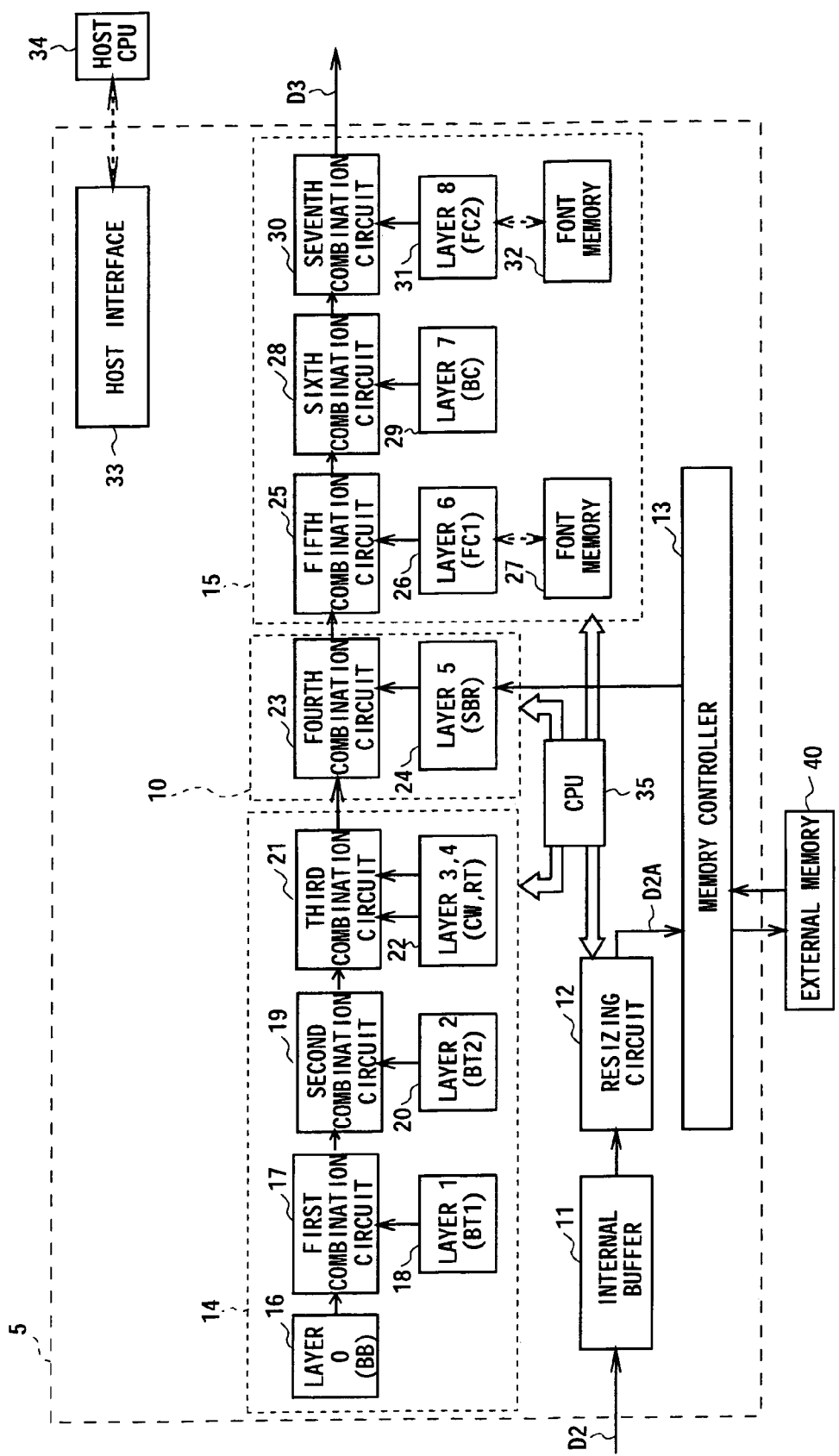
FIG. 2 is a schematic block diagram showing the circuit configuration of an OSD generation section.

As shown in FIG. 2, the OSD generation section 5 includes an internal buffer 11 to temporarily store the proxy video signal D2 supplied from the proxy decoder 4 (FIG. 1). And then the resizing circuit 12 performs resizing process for the proxy video signal D2 to generate thumbnail image data D2A. The thumbnail image data D2A includes thumbnail images which are set to a certain size. The thumbnail image data D2A is subsequently supplied to an external memory 40, which is for example equivalent to Synchronous Dynamic Random Access Memory (SDRAM), via a memory controller 13. As a result, the thumbnail image data D2A is cached in the external memory 40.

The memory controller 13 sequentially stores in the external memory 40 the thumbnail image data D2A supplied from the resizing circuit 12 such that the external memory 40 memorizes a plurality of thumbnails. The memory controller 13 reads out the thumbnail image data D2A from the external memory 40 when needed. The memory controller 13 then supplies the thumbnail image data D2A to a layer-5 generation circuit 24 of a video screen generation section 10.

Figure 3:
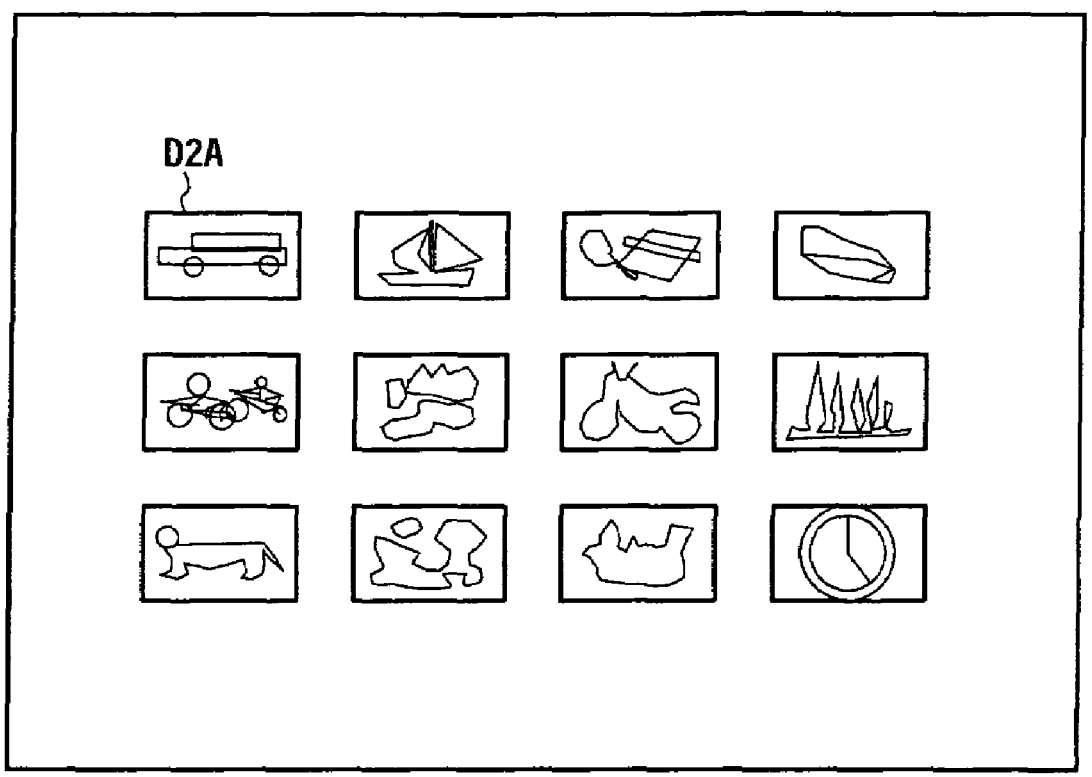
FIG. 3 is a schematic diagram showing a thumbnail video screen.

The layer-5 generation circuit 24 places a plurality of thumbnail image data D2A, which are read out by the memory controller 13 from the external memory 40, in a certain order and configuration to be viewed. This produces a layer of thumbnail video screen SBR showing the thumbnail image data D2A (the plurality of thumbnails) as shown in FIG. 3. The layer-5 generation circuit 24 then supplies the layer of thumbnail video screen SBR to a fourth combination circuit 23.

By the way, the OSD generation circuit 5 (FIG. 2) includes: a background graphics generation section 14 for generating a background screen BGGR (described below) which includes background images and the like, and which is to be placed on the background side of the thumbnail video screen SBR shown in FIG. 3 (i.e. which is to be placed behind the thumbnail video screen SBR); and, a foreground graphics generation section 15 for generating a foreground screen FGGR (described below) which includes menus and the like, and which is to be placed on the foreground side of the thumbnail video screen SBR (i.e. which is to be placed in front of the thumbnail video screen SBR). A CPU 35 controls the video screen generation section 10, the background graphics generation section 14 and the foreground graphics generation section 15.

By the way, the CPU 35 can control the resizing circuit 12. This allows the CPU 35 to adjust the size and the like of thumbnail image data D2A that make up the thumbnail video screen SBR.

Figure 4:
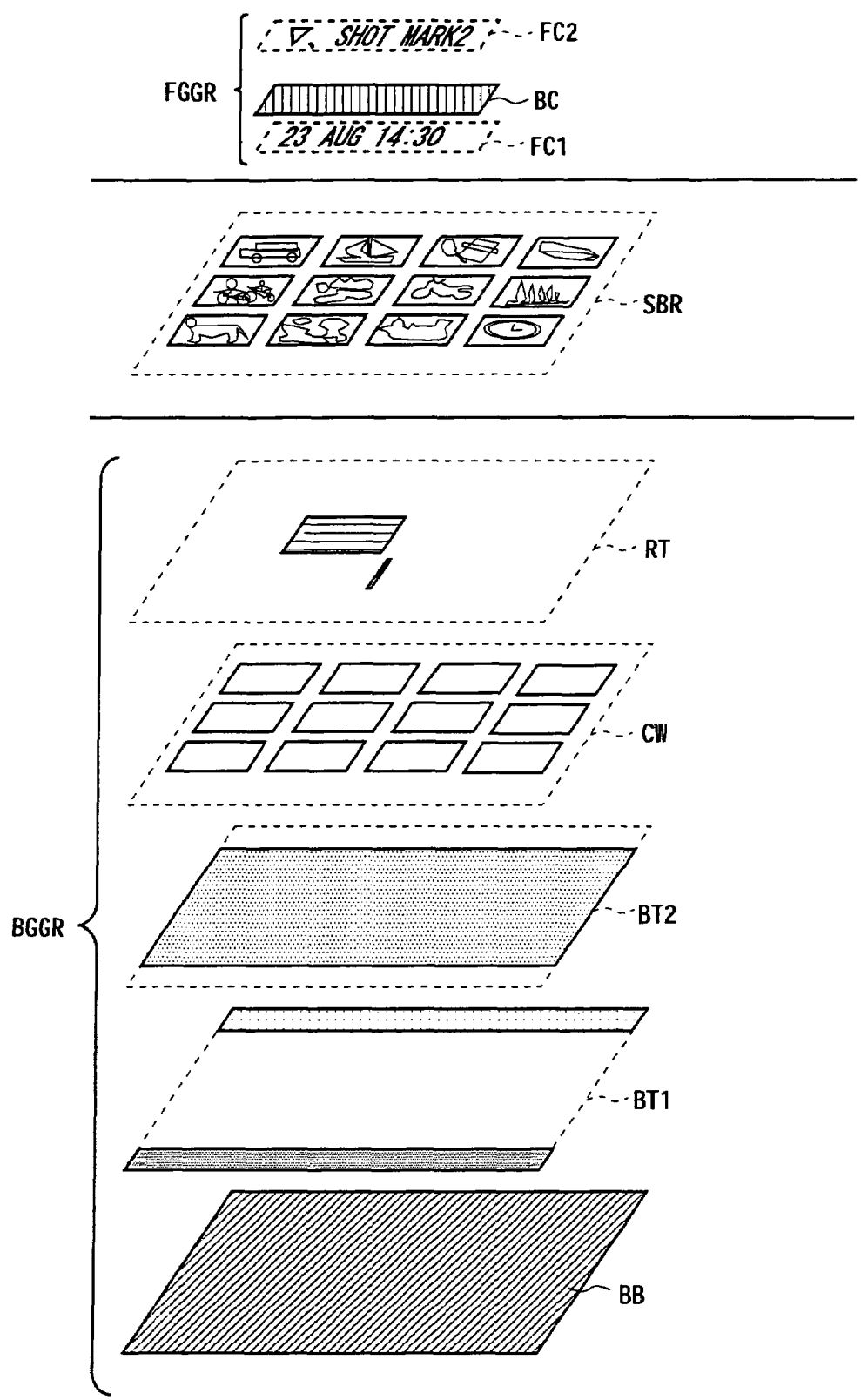
FIG. 4 is a schematic diagram illustrating a combination of a plurality of layers.

As shown in FIG. 4, the background graphics generation section 14 generates the background screen BGGR that is made of 5 layers (Layer 0 to Layer 4). These layers (Layer 0 to Layer 4) are to be placed behind the thumbnail video screen SBR (Layer 5). The foreground graphics generation section 15 generates the foreground screen FGGR that is made of 3 layers (Layer 6 to Layer 8). These layers (Layer 6 to Layer 8) are to be placed in front of the thumbnail video screen SBR.

The background screen BGGR is made by combining a background image plane BB (Layer 0), which is located at the bottom; a first background texture BT1 (Layer 1), which is located above the background image plane BB; a second background texture BT2 (Layer 2), which is located above the first background texture BT1; a cursor window plane CW (Layer 3), which is located above the second background texture BT2; and a monochromatic rectangle plane RT (Layer 4), which is located above the cursor window plane CW.

Specifically, in the background graphics generation section 14 (FIG. 2), the background image plane BB generated by a layer-0 generation circuit 16 is supplied to a first combination circuit 17. The first background texture BT1 generated by a layer-1 generation circuit 18 is also supplied to the first combination circuit 17.

The first combination circuit 17 combines the background image plane BB and the first background texture BT such that the first background texture BT is placed on the background image plane BB, and then supplies the resulting data to a second combination circuit 19.

The background image plane BB generated by the layer-0 generation circuit 16 includes attribute information about a "color" of the background image plane BB. When the CPU 35 changes parameters of the layer-0 generation circuit 16, the "color" of the background image plane BB changes accordingly.

Similarly, the first background texture BT1 generated by the layer-1 generation circuit 18 includes attribute information about a "design and pattern" relating to the texture. When the CPU 35 changes parameters of the layer-1 generation circuit 18, the "design and pattern" of the first background texture BT1 changes accordingly.

When the second background texture BT2 generated by a layer-2 generation circuit 20 is supplied, the second combination circuit 19 combines the second background texture BT2 and the data supplied from the first combination circuit 17, and then supplies the resulting data to a third combination circuit 21.

The second background texture BT2 generated by the layer-2 generation circuit 20 includes attribute information about a "design and pattern" relating to the texture. When the CPU 35 changes parameters of the layer-2 generation circuit 20, the "design and pattern" of the second background texture BT2 changes accordingly.

Figure 5:
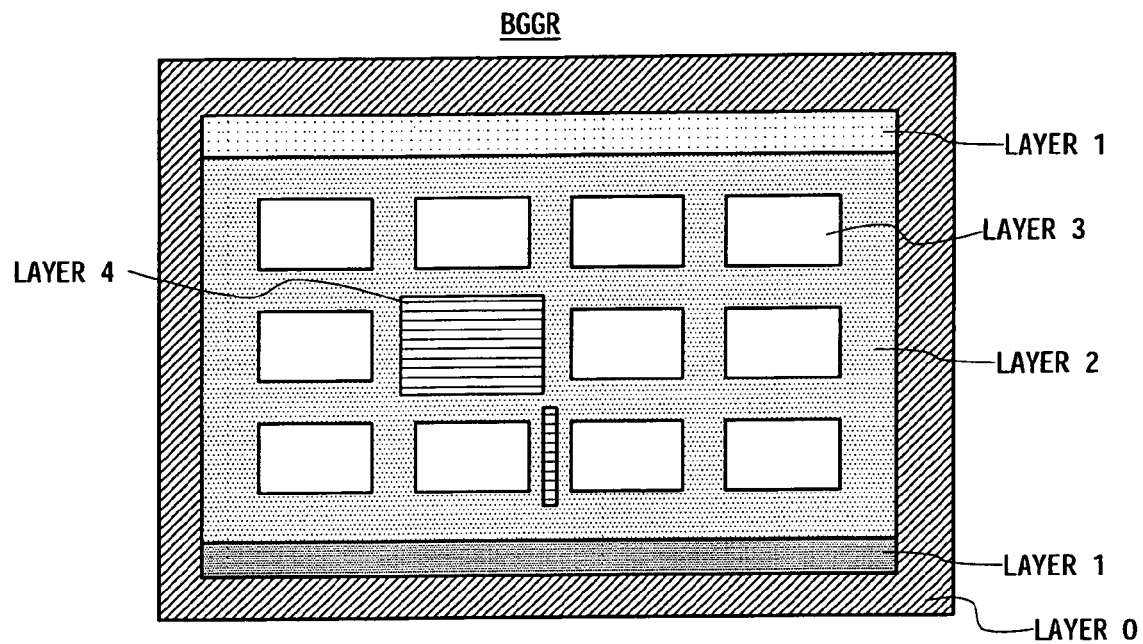
FIG. 5 is a schematic diagram showing a background screen.

When the cursor window plane CW and monochromatic rectangle plane RT generated by a layer-3-and-4 generation circuit 22 are supplied, the third combination circuit 21 puts the cursor window plane CW on the data supplied from the second combination circuit 19, and then puts the monochromatic rectangle plane RT thereon to combine. This produces the background screen BGGR (FIG. 5) that is made of 5 layers (Layer 0 to Layer 4) in total. The third combination circuit 21 subsequently supplies the background screen BGGR to the fourth combination circuit 23 of the video screen generation section 10.

The cursor window plane CW generated by the layer-3-and-4 generation circuit 22 provides frames for thumbnail images of the thumbnail list image. The frames are for example rectangle in shape. In this case, the cursor window plane CW has only a predetermined number of frames, which is previously set by the layer-3-and-4 generation circuit 22. The number of frames may not be increased after it is set.

The cursor window plane CW and the monochromatic rectangle plane RT include attribute information about a "color", "horizontal and vertical size", "degree of transmittance" and "location" relating to the rectangular object. When the CPU 35 changes parameters of the layer-3-and-4 generation circuit 22, the "color", "horizontal and vertical size", "degree of transmittance" and "location" relating to the rectangular object change accordingly.

The thumbnail video screen SBR (FIG. 3) is supplied from the layer-5 generation circuit 24 to the fourth combination circuit 23 of the video screen generation section 10. The fourth combination circuit 23 puts the thumbnail video screen SBR on the background screen BGGR supplied from the third combination circuit 21 of the background graphics generation section 14. That produces data where the background screen BGGR is covered with the thumbnail video screen SBR. The fourth combination circuit 23 then supplies this data to a fifth combination circuit 25 of the foreground graphics generation section 15.

The thumbnail video screen SBR generated by the layer-5 generation circuit 24 includes attribute information about a "degree of transmittance", "location" and the like relating to the thumbnail images. When the CPU 35 changes parameters of the layer-5 generation circuit 24, the "degree of transmittance" and "location" relating to the thumbnail images change accordingly.

A layer-6 generation circuit 26 supplies to the fifth combination circuit 25 a first foreground character plane FC1 (Layer 6) whose characters are in a certain font. The fifth combination circuit 25 then puts the first foreground character plane FC1 on the data supplied from the fourth combination circuit 23 to combine. The fifth combination circuit 25 subsequently supplies the resulting data to a sixth combination circuit 28.

The layer-6 generation circuit 26 that includes a character generator is connected to a font memory 27. When the CPU 35 changes parameters of the layer-6 generation circuit 26, the layer-6 generation circuit 26 selects a font from among a plurality of fonts stored in the font memory 27 for the first foreground character plane FC1 (Layer 6), or changes the color and locations of the characters displayed.

A layer-7 generation circuit 29 generates a menu frame plane BC, and supplies the menu frame plane BC to the sixth combination circuit 28. The sixth combination circuit 28 puts the menu frame plane BC on the data supplied from the fifth combination circuit 25 to combine. The sixth combination circuit 28 then supplies the resulting data to a seventh combination circuit 30.

The menu frame plane BC generated by the layer-7 generation circuit 29 includes attribute information about a "size" and "shape" relating to menu frames. When the CPU 35 changes parameters of the layer-7 generation circuit 29, the "size" and "shape" relating to the menu frames change accordingly. In this case, the menu frame plane BC has only a predetermined number of frames, which is previously set by the layer-7 generation circuit 29. The number of frames may not be increased after it is set.

Figure 6:
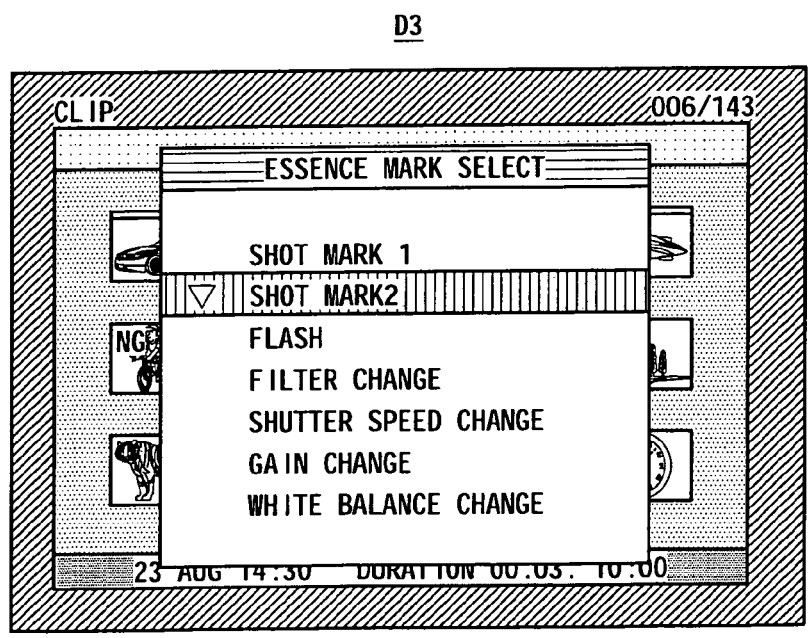
FIG. 6 is a schematic diagram showing an on-screen image.

A layer-8 generation circuit 31 generates a second foreground character plane FC2, and supplies the second foreground character plane FC2 to the seventh combination circuit 30. The seventh combination circuit 30 puts the second foreground character plane FC2 on the data supplied from the sixth combination circuit 28 to combine. This produces the on-screen image D3 as shown in FIG. 6. The seventh combination circuit 30 then supplies the on-screen image D3 to the following switch circuit 3 (FIG. 1).

Figure 7:
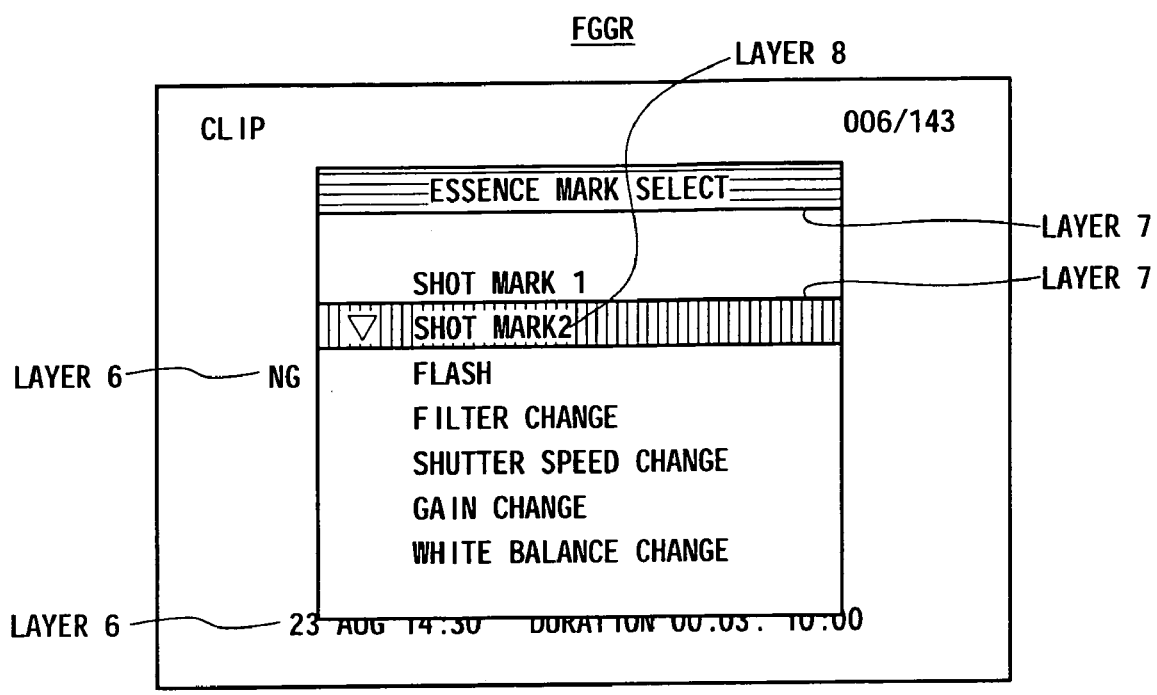
FIG. 7 is a schematic diagram showing a foreground screen.

By the way, the foreground graphics generation section 15 is a section that produces the foreground screen FGGR as shown in FIG. 7 by combining the Layer 6, the Layer 7 and the Layer 8 through the fifth combination circuit 25, the sixth combination circuit 28 and the seventh combination circuit 30.

In the OSD generation section 5, the background graphics generation section 14 and the foreground graphics generation section 15 are respectively placed at the foreside and backside of the video screen generation section 10. Therefore, the OSD generation section 5 can produce the background screen BGGR, which is to be located behind the thumbnail video screen SBR, and the foreground screen FGGR, which is to be located in front of the thumbnail video screen SBR, separately.

The CPU 35 of the OSD generation section 5 can control whether to combine the background screen BGGR and/or the foreground screen FGGR with the thumbnail video screen SBR by adjusting the output of the background graphics generation section 14 and foreground graphics generation section 15 which are respectively located at the foreside and backside of the video screen generation section 10.

The layer-8 generation circuit 31 that includes a character generator is connected to a font memory 32. When the CPU 35 changes parameters of the layer-8 generation circuit 31, the layer-8 generation circuit 31 selects a font from among a plurality of fonts stored in the font memory 32 for the second foreground character plane FC2 (Layer 8), or changes the color and locations of the characters displayed.

By the way, a host CPU 34 can provide the font memory 27 and the font memory 32 with new fonts through a host interface 33.

(3) Operation and Effect

In the video camera 1 with the above configuration, the size of images is set to 1440×1080 ([the number of horizontal pixels]×[the number of lines]) in order to easily convert the number of horizontal pixels in the video signal S2 and on-screen image D3 through the first horizontal pixel conversion circuit 6 and second horizontal pixel conversion circuit 8. This allows the video camera 1 to utilize the simple ratios (such as 4/3 and 1/2) to multiply when converting the number of horizontal pixels for HD format output or SD format output.

That reduces more processing load of the first horizontal pixel conversion circuit 6 and second horizontal pixel conversion circuit 8 than they use a complex conversion ratio, and saves power on the video camera 1.

Specifically, in the video camera 1, the number of horizontal pixels in the video signal 2 and the on-screen image D3 is set to 1440, which is between the horizontal pixel counts of HD format (i.e. 1920) and the horizontal pixel counts of SD format (i.e. 720). Therefore, when outputting in both HD and SD format, it takes almost the same time and same power to convert the images into HD-format images and into SD-format images. This can eliminate time difference between HD output and SD output.

If the video camera 1 generated the on-screen image that fitted HD-format or SD-format from the beginning, the first horizontal pixel conversion circuit 6 or the second horizontal pixel conversion circuit 8 could be omitted. However, this could increase the processing load of the first horizontal pixel conversion circuit 6 or the second horizontal pixel conversion circuit 8, and cause imbalance of image qualities between the HD-format output and the SD-format output.

By contrast, in this video camera 1, the first horizontal pixel conversion circuit 6 and the second horizontal pixel conversion circuit 8 can up-convert and down-convert the on-screen image D3, which was generated by the OSD generation section 5, by using a relatively simple conversion ratio. This can reduce the processing load of the first horizontal pixel conversion circuit 6 and the second horizontal pixel conversion circuit 8, and eliminate the imbalance of image qualities.

In this OSD generation section 5, not all parts of the on-screen image D3 are generated by software under the control of the CPU 35. Hardware sections, i.e. the background graphics generation section 14 and the foreground graphics generation section 15, are placed at the foreside and backside of the video screen generation section 10. The OSD generation section 5 uses the video screen generation section 10, the background graphics generation section 14 and the foreground graphics generation section 15 as components to produce the on-screen image D3 which will be output.

Therefore, the OSD generation section 5 may perform processes to provide a large amount of parameters to the background graphics generation section 14, the video screen generation section 10 and the foreground graphics generation section 15. However, the amount of software process is smaller than ever before, and this reduces the processing load of the CPU 35.

The CPU 35 of the OSD generation section 5 can decide whether to combine the background screen BGGR and/or the foreground screen FGGR with the thumbnail video screen SBR just by controlling the output of the background graphics generation section 14 and foreground graphics generation section 15, which are located at the foreside and backside of the video screen generation section 10. At this time, the OSD generation section 5 calculates more efficiently than when it uses software to produce the images.

Specifically, when combining the background screen BGGR with the thumbnail video screen SBR, the OSD generation section 5 requests the background graphics generation section 14 to output the background screen BGGR. When removing the background screen BGGR, the OSD generation section 5 requests the background graphics generation section 14 not to output the background screen BGGR. When combining the foreground screen FGGR with the thumbnail video screen SBR, the OSD generation section 5 requests the foreground graphics generation section 15 to output the foreground screen FGGR. When removing the foreground screen FGGR, the OSD generation section 5 requests the foreground graphics generation section 15 not to output the foreground screen FGGR. Accordingly, the OSD generation section 5 does not have to make the on-screen image D3 from scratch every time the contents of on-screen image D3 change. That tremendously reduces the processing load of the CPU 35.

Especially, when removing the foreground screen FGGR, which includes menus, from the on-screen image D3, the CPU 35 of the OSD generation section 5 just requests the foreground graphics generation section 15 not to output the foreground screen FGGR. This holds down the rise of the processing load.

In the OSD generation section 5, only the thumbnail images D2A are supplied to the layer-5 generation circuit 24 from the external memory 40, while the background screen BGGR and the foreground screen FGGR are not transmitted between them. This keeps the amount of data transmitted between the layer-5 generation circuit 24 and the external memory 40 under a certain level. Therefore, in the OSD generation section 5, some parts of the band can be available for buffering to adjust a delay time.

Due to the configuration described above, the video camera 1 uses a relatively simple integer ratio (such as 4/3 and 1/2) as the conversion ratio to convert the number of horizontal pixels in the video signal S2 and on-screen image D3 into HD-format and SD-format output. This tremendously reduces the computational processing load of the first horizontal pixel conversion circuit 6 and second horizontal pixel conversion circuit 8, and saves power.

In addition, the OSD generation section 5 of the video camera 1 includes hardware components, i.e. the background graphics generation section 14 and the foreground graphics generation section 15, at the foreside and backside of the video screen generation section 10 to produce the on-screen image D3. This minimizes software process load, and tremendously reduces the processing load of the CPU 35.

In this manner, using the simple conversion ratio reduces the overall processing load of the video camera 1 and especially the processing load of the OSD generation section 5 is reduced. As a result, the processing load is reduced dramatically, and this saves power on the video camera 1.

(4) Other Embodiments

In the above-noted embodiments, the background graphics generation section 14, the video screen generation section 10 and the foreground graphics generation section 15 are superimposed in order of time to put the images together in that order to produce the on-screen image D3. However, the present invention is not limited to this. The background graphics generation section 14, the video screen generation section 10 and the foreground graphics generation section 15 may be superimposed in parallel. In this case, the video camera 1 may have a combination circuit to combine the background screen BGGR, thumbnail video screen SBR and foreground screen FGGR, which are produced by each generation section, in a certain order.

In this case, this combination circuit can change the order of images (i.e. the background screen BGGR, the thumbnail video screen SBR and the foreground screen FGGR) to produce an on-screen image.

In the above-noted embodiments, the video camera 1 converts the video signal S2 and on-screen image D3 with 1440 horizontal pixels in HD-format and SD-format. However, the present invention is not limited to this. The video camera 1 may convert video signals and on-screen images with 960 or 640 horizontal pixels in HD-format and SD-format. Note that it is desirable to use simple conversion ratios to convert.

Figure 8:
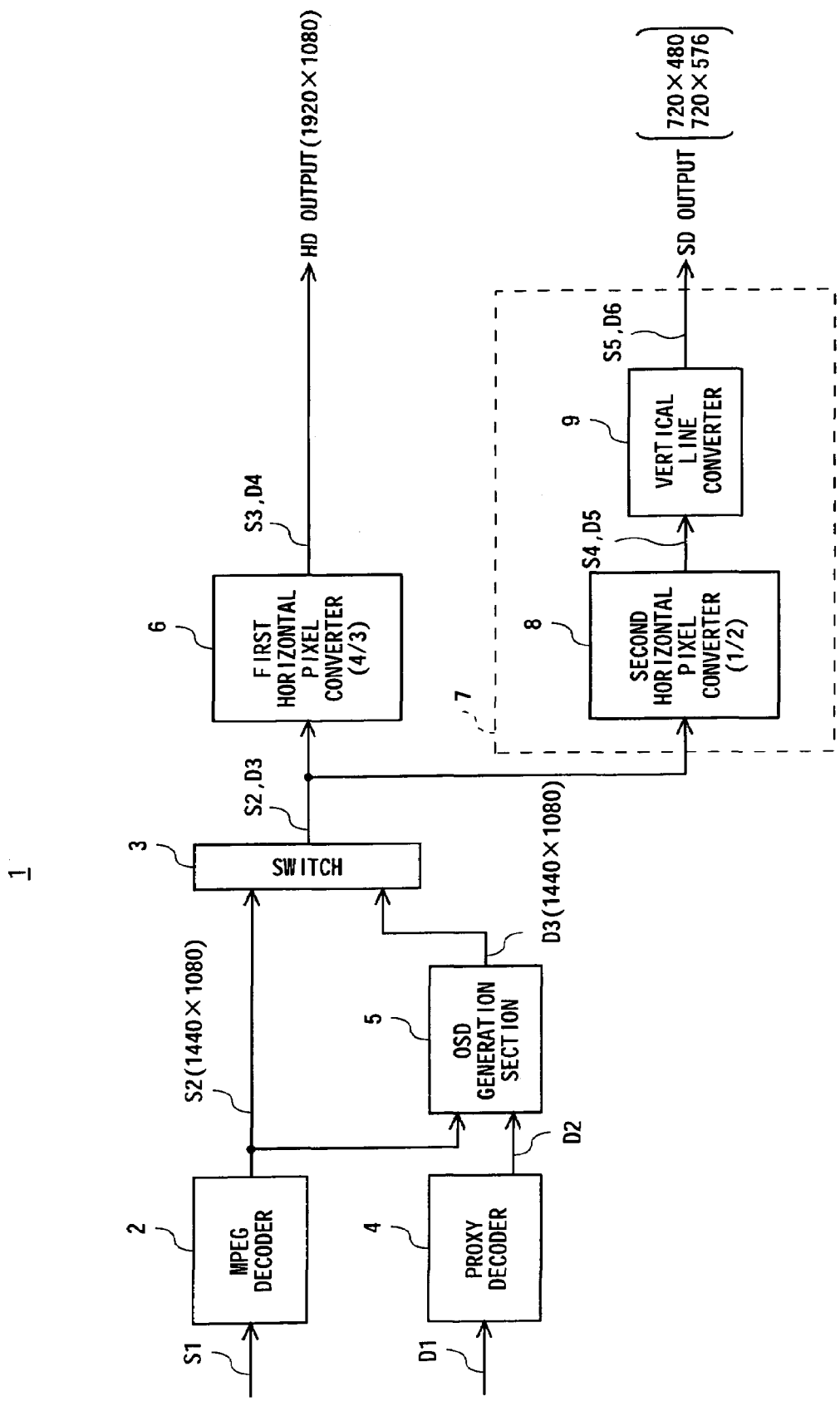
FIG. 8 is a schematic diagram showing the configuration of a video camera according to another embodiment of the present invention.

In the above-noted embodiments, the video camera 1 combines the background screen BGGR and the foreground screen FGGR with the thumbnail video screen SBR to produce the on-screen image D3. However, the present invention is not limited to this. As shown in FIG. 8, the video camera 1 may combine the background screen BGGR and the foreground screen FGGR with a video screen equivalent to the video signal S2 of main-line videos to produce the on-screen image.

In the above-noted embodiments, the on-screen image D3 that is made of 9 layers in total is generated by combining the thumbnail video screen SBR, the background screen BGGR and the foreground screen FGGR. However, the number of layers that make up the on-screen image D3 is not limited to this.

In the above-noted embodiments, the resolutions of two kinds of signals, which are simultaneously output from the video camera 1, are 1920×1080 ([the number of horizontal pixels]×[the number of lines]) in HD format and 720×1080 ([the number of horizontal pixels]×[the number of lines]) in SD format. However, the resolutions of standard definition television signals and high definition television signals, which are simultaneously output from the video camera, are not limited to this.

In the above-noted embodiments, the on-screen image D3 is output through lines in HD and SD format. In addition to that, the on-screen image D3 may be output through View Finder.

In the above-noted embodiments, the first horizontal pixel conversion circuit 6 uses the conversion ratio of 4/3, while the second horizontal pixel conversion circuit 8 uses the conversion ratio of 1/2. However, the conversion ratios are not limited to this. Other conversion ratios can be used to reduce the computational processing load.

The on-screen display apparatus and on-screen display generation method according to an embodiment of the present invention for example can be applied to not only video cameras but also stationary video recorders.

It should be understood by those skilled in the art that various modifications, combinations, sub-combinations and alterations may occur depending on design requirements and other factors insofar as they are within the scope of the appended claims or the equivalents thereof.

What is claimed is:

1. An on-screen display apparatus comprising:
   an on-screen image generation section generating an on-screen image having a predetermined number of horizontal pixels, said predetermined number of horizontal pixels being set between horizontal pixel counts of high definition television signals and horizontal pixel counts of standard definition television signals;
   a first horizontal pixel conversion section converting the number of horizontal pixels of said on-screen image by using a certain conversion ratio such that the number of horizontal pixels of said on-screen image corresponds to the horizontal pixel counts of said high definition television signals; and
   a second horizontal pixel conversion section converting the number of horizontal pixels of said on-screen image by using a certain conversion ratio such that the number of horizontal pixels of said on-screen image corresponds to the horizontal pixel counts of said standard definition television signals.

2. The on-screen display apparatus according to claim 1, wherein the number of horizontal pixels of said on-screen image is set such that the conversion ratio of said first horizontal pixel conversion section is a certain integer ratio and the conversion ratio of said second horizontal pixel conversion section is a certain integer ratio.

3. The on-screen display apparatus according to claim 1, wherein said second horizontal pixel conversion section includes a line counts conversion section converting the number of lines of said on-screen image.

4. The on-screen display apparatus according to claim 1, wherein said on-screen image generation section comprising:
   a video screen generation section generating a video screen that includes a layer to display a video image;
   a background screen generation section generating a background screen that includes a layer to display a background image behind said video screen; and
   a foreground screen generation section generating a foreground screen that includes a layer to display a surface image in front of said video screen,
   wherein the on-screen image is generated by combining said background screen, said video screen and said foreground screen in a predetermined order.

5. The on-screen display apparatus according to claim 4, wherein said on-screen image generation section further comprising a control section directing said video screen generation section, said background screen generation section and said foreground screen generation section to change a certain parameter to change said video image, said background image and said surface image.

6. The on-screen display apparatus according to claim 4, further comprising
   a proxy decoder section outputting a proxy video signal after decoding proxy video data, said proxy video data being in a predetermined format as reference videos, wherein
   said on-screen image generation section further comprising:
      a buffer section temporarily storing said proxy video signal;
      a resizing section generating thumbnail image data by changing a size of said proxy video signal stored;
      a memory section storing said thumbnail image data generated, said thumbnail image data including a plurality of thumbnails; and
      a memory controller section outputting said thumbnail image data to said video screen generation section after reading out said thumbnail image data from said memory section.

7. The on-screen display apparatus according to claim 6, wherein said video screen generation section places a plurality of thumbnail image data in a predetermined order and predetermined positions to generate a thumbnail list image as said video screen, said plurality of thumbnail image data being output from said memory section.

8. The on-screen display apparatus according to claim 4, wherein said foreground screen generation section generates a menu image as said foreground screen.

9. An on-screen display generation method comprising:
   an on-screen image generation step of generating an on-screen image having a predetermined number of horizontal pixels, said predetermined number of horizontal pixels being set between horizontal pixel counts of high definition television signals and horizontal pixel counts of standard definition television signals; and
   a horizontal pixel conversion step of converting the number of horizontal pixels of said on-screen image by using a certain conversion ratio such that the number of horizontal pixels of said on-screen image corresponds to the horizontal pixel counts of said high definition television signals, and converting the number of horizontal pixels of said on-screen image by using a certain conversion ratio such that the number of horizontal pixels of said on-screen image corresponds to the horizontal pixel counts of said standard definition television signals.

10. The on-screen display generation method according to claim 9, wherein said on-screen image generation step comprising:
   a background screen generation step of generating a background screen that includes a layer to display a background image behind a video screen, said video screen including a layer for displaying a video image;
   a video screen generation step of combining said video screen with said background screen after generating said video screen;
   a foreground screen generation step of generating the on-screen image by combining a foreground screen with said video screen after generating said foreground screen that includes a layer to display a surface image in front of said video screen.

* * * * *